(12) United States Patent
Zheng et al.

(10) Patent No.: US 10,427,257 B2
(45) Date of Patent: Oct. 1, 2019

(54) WHEEL MILLING WINDOW FIXTURE

(71) Applicant: CITIC Dicastal CO., LTD., Qinhuangdao, Hebei (CN)

(72) Inventors: Yao Zheng, Qinhuangdao (CN); Yeling Tian, Qinhuangdao (CN); Zegong He, Qinhuangdao (CN); Yongwang Zhao, Qinhuangdao (CN); Yukun Yang, Qinhuangdao (CN); Guangcai Wei, Qinhuangdao (CN)

(73) Assignee: CITIC Dicastal CO., LTD., Qinhuangdao, Hebei (CN)

( * ) Notice: Subject to any disclaimer, the term of this patent is extended or adjusted under 35 U.S.C. 154(b) by 159 days.

(21) Appl. No.: 15/808,260

(22) Filed: Nov. 9, 2017

(65) Prior Publication Data
US 2019/0061078 A1  Feb. 28, 2019

(30) Foreign Application Priority Data

Aug. 27, 2017   (CN) .......................... 2017 1 0746849

(51) Int. Cl.
| | |
|---|---|
| *B25B 11/00* | (2006.01) |
| *B23Q 3/06* | (2006.01) |
| *B23Q 3/08* | (2006.01) |
| *B23C 3/00* | (2006.01) |

(52) U.S. Cl.
CPC ................ *B23Q 3/062* (2013.01); *B23C 3/00* (2013.01); *B23Q 3/082* (2013.01); *B23C 2215/085* (2013.01); *B23C 2270/025* (2013.01); *B23C 2270/08* (2013.01); *B23Q 2703/04* (2013.01); *B23Q 2703/10* (2013.01)

(58) Field of Classification Search
CPC ........... B25B 11/00; B25B 11/02; B23Q 3/00; B23Q 3/082
See application file for complete search history.

(56) References Cited

U.S. PATENT DOCUMENTS

| | | | | |
|---|---|---|---|---|
| 5,810,341 A | * | 9/1998 | Williams | ............. B23Q 16/001 |
| | | | | 269/289 MR |
| 7,204,493 B1 | | 4/2007 | Gatton | |

(Continued)

FOREIGN PATENT DOCUMENTS

| | | |
|---|---|---|
| DE | 102008014835 A1 | 9/2009 |
| DE | 202012011628 U1 | 1/2013 |

OTHER PUBLICATIONS

Supplementary European Search Report in the European application No. 18190681.9, dated Feb. 1, 2019, 6 pgs.

*Primary Examiner* — Lee D Wilson
(74) *Attorney, Agent, or Firm* — Cooper Legal Group, LLC

(57) ABSTRACT

Disclosed is a wheel milling window device, composed of a bottom plate, guide blocks, clamping slide blocks, mounting keys, hydraulic cylinders, hydraulic pipelines, connecting blocks, pressure claws, first rotating shafts, second rotating shafts, end face blocks, a mandrel, a mandrel seat, a locking jackscrew, a mandrel height adjusting post, a mandrel guide post, a mandrel guide post locking screw, a locking ring, circumferential positioning posts and circumferential slide blocks. The device can reduce the manufacturing cost, shorten the manufacturing period, effectively reduce the time for replacing a fixture and improve the efficiency of milling a wheel window.

5 Claims, 5 Drawing Sheets

(56) References Cited

U.S. PATENT DOCUMENTS

| | | | | |
|---|---|---|---|---|
| 7,926,797 B2* | 4/2011 | Sorenson | ............ | G02B 6/4475 |
| | | | | 269/138 |
| 8,517,361 B2* | 8/2013 | Sambuceto | ............... | B25B 5/14 |
| | | | | 269/37 |
| 2007/0273108 A1 | 11/2007 | Kitatsuru | | |
| 2011/0068544 A1 | 3/2011 | Prust | | |

* cited by examiner

WHEEL MILLING WINDOW FIXTURE

CROSS-REFERENCE TO RELATED APPLICATIONS

The present application claims benefit of Chinese Patent Application No. 201710746849.7, filed on Aug. 27, 2017, the contents of which are hereby incorporated by reference in its entirety.

BACKGROUND

Wheel windows need to be machined in the machining process of automobile wheels, and particularly, wheel windows of forged wheel products are substantially machined in a manner of milling.

Milling fixtures for windows generally realize central positioning via fixed expansion sleeves or mandrels. However, due to the diversity of heights of wheel products, expansion sleeves or mandrels having corresponding heights need to be manufactured according to different products; and axial positioning often only adapts to fixtures of one size according to the magnitude of radial sizes of wheels, thereby bringing much inconvenience on the aspect of replacing the fixtures and influencing the production efficiency.

SUMMARY

The disclosure relates to a milling fixture, specifically to a wheel milling window fixture.

The disclosure is aimed at providing a wheel milling window device. According to the heights and diameters of different products, the fixture can be quickly adjusted via self-structure, thereby reducing manufacturing of fixtures, reducing the production cost and improving the production efficiency of wheels.

In order to fulfill the above aim, the disclosure adopts the technical solution: a wheel milling window device. The device is composed of a bottom plate, guide blocks, clamping slide blocks, mounting keys, hydraulic cylinders, hydraulic pipelines, connecting blocks, pressure claws, first rotating shafts, second rotating shafts, end face blocks, a mandrel, a mandrel seat, a locking jackscrew, a mandrel height adjusting post, a mandrel guide post, a mandrel guide post locking screw, a locking ring, circumferential positioning posts and circumferential slide blocks. The bottom plate is fixed on a machine tool via bolts, the four guide blocks are fixed on the bottom plate by screws, the clamping slide blocks slide in slots of the guide blocks, each end face block can be placed in a clamping slide block and fixed by two screws, the end face blocks and the clamping slide blocks are fixed on the bottom plate by screws, the hydraulic cylinders are fixed on the clamping slide blocks by the mounting keys and screws, meanwhile, the hydraulic pipelines are connected and fixed to the hydraulic cylinders via screws, the connecting blocks are fixed at the extension ends of the hydraulic cylinders via threaded connection, the pressure claws are articulated into holes of the connecting blocks via the first rotating shafts and simultaneously articulated to the end face blocks via the second rotating shafts, the mandrel seat is fixed on the bottom plate via six screws, the mandrel height adjusting post is in clearance fit in the hole of the mandrel seat, the mandrel guide post is in clearance fit in the hole of the mandrel height adjusting post, the locking ring and the mandrel guide post are locked via threads by the mandrel guide post locking screw, the mandrel is fixed on the mandrel height adjusting post by a screw, and the circumferential positioning posts can be fixed on the circumferential slide blocks via threads.

In the working process, the end face blocks scribed with scribed lines in the middle of end face positioning surfaces are fixed together with the clamping slide blocks; the clamping slide blocks can slide in the slots of the guide blocks, the guide blocks are scribed with scribed lines corresponding to different wheel sizes, and the positions of the scribed lines are determined according to the outer diameters of the rims of wheels having different sizes; when a wheel of one size is machined, the clamping slide blocks fixed together with the end face blocks can slide in the slots of the guide blocks, the scribed lines on the end face blocks are aligned with the scribed lines of corresponding sizes on the guide blocks, then the end face blocks and the clamping slide blocks are fixed on the bottom plate by bolts, and end face positioning of the wheel and adjustment of the compression position are thus realized.

The mandrel corresponding to the diameter of the central hole of the wheel is placed on the mandrel height adjusting post, the extending height of the mandrel height adjusting post on the mandrel seat is adjusted via the screw, the mandrel height adjusting post is locked by the locking jackscrew after the height is adjusted, and radial positioning adjustment of the wheel is thus completed.

The circumferential slide blocks slide to the pitch diameters of bolt holes or mounting holes of the wheel on the bottom plate, the circumferential positioning posts are screwed down with the circumferential slide blocks, the circumferential positioning posts can penetrate through the bolt holes or mounting holes of the wheel when the wheel is placed on the device, and a circumferential positioning function on the wheel is thus realized.

The wheel is placed on the end face blocks, radial positioning of the central hole is realized via the mandrel, the circumferential positioning posts penetrate through the bolt holes or mounting holes, then the extension rods of the hydraulic cylinders move linearly via the hydraulic system to drive the connecting blocks to move, the first rotating shafts are thus driven to move in shaft slots of the pressure claws, the pressure claws move circumferentially using the second rotating shafts as circle centers, and the wheel is pressed.

In a preferred embodiment of the disclosure, the guide blocks are fixed on the bottom plate and scribed with corresponding scribed lines according to wheels having different diameters, the end face blocks and the clamping slide blocks are fixed together, and the end face blocks are scribed with scribed lines; when a wheel type is changed, the fixture may not be completely detached, but fixing screws on the end face blocks are unscrewed, then the end face blocks and the clamping slide blocks slide to the positions of corresponding sizes in the guide blocks, finally, the end face block sand the clamping slide blocks are screwed down on the bottom plate via the screws, and the effect of quickly replacing the fixture is achieved.

In a preferred embodiment of the disclosure, by placing the mandrel into the mandrel seat, the height of the mandrel can be axially adjusted to adapt to the products having different heights, so that mandrels having corresponding heights, manufactured according to different heights like before, can be reduced, the production cost is reduced, the manufacturing period of the fixture is shortened, and the production efficiency is improved.

Figure 1:
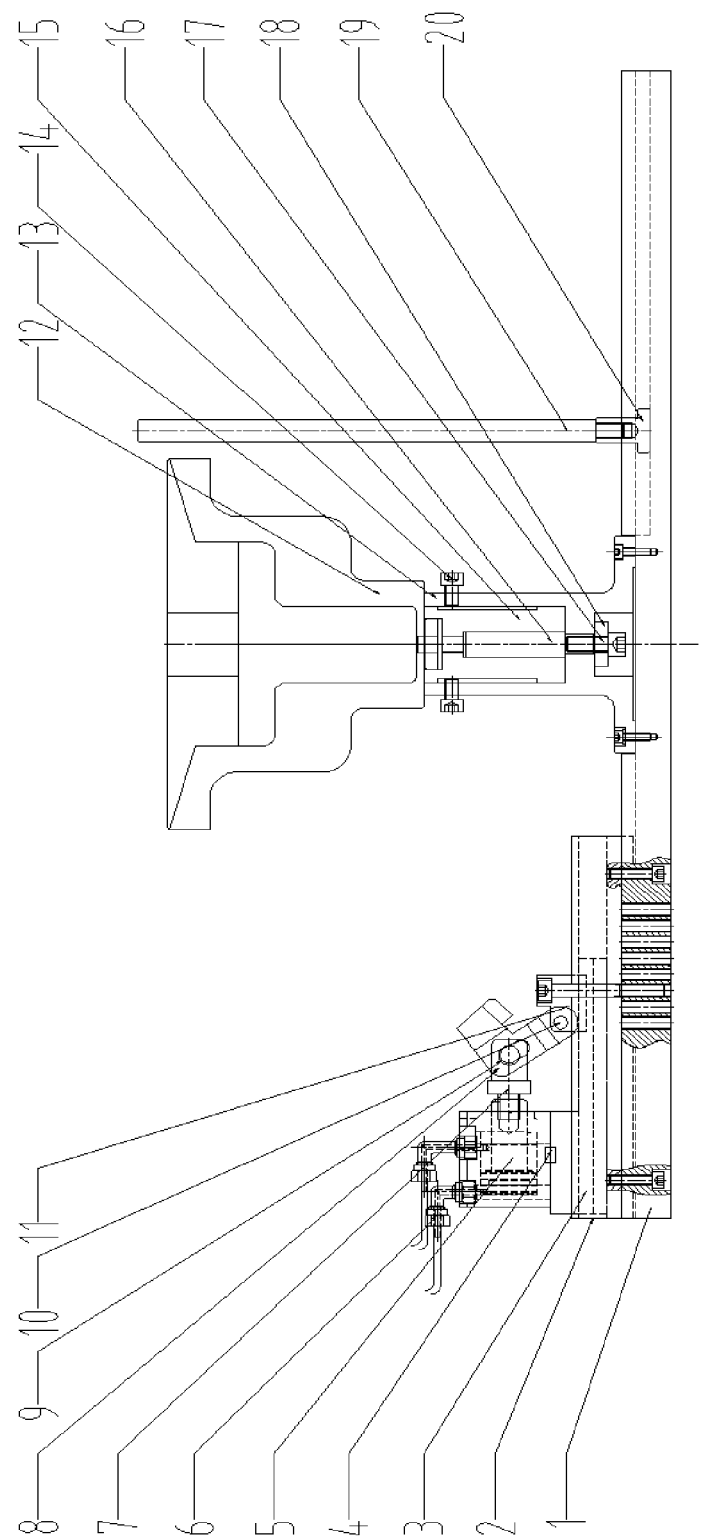
FIG. 1 is a structural schematic diagram of a wheel milling window device of the disclosure.
Figure 2:
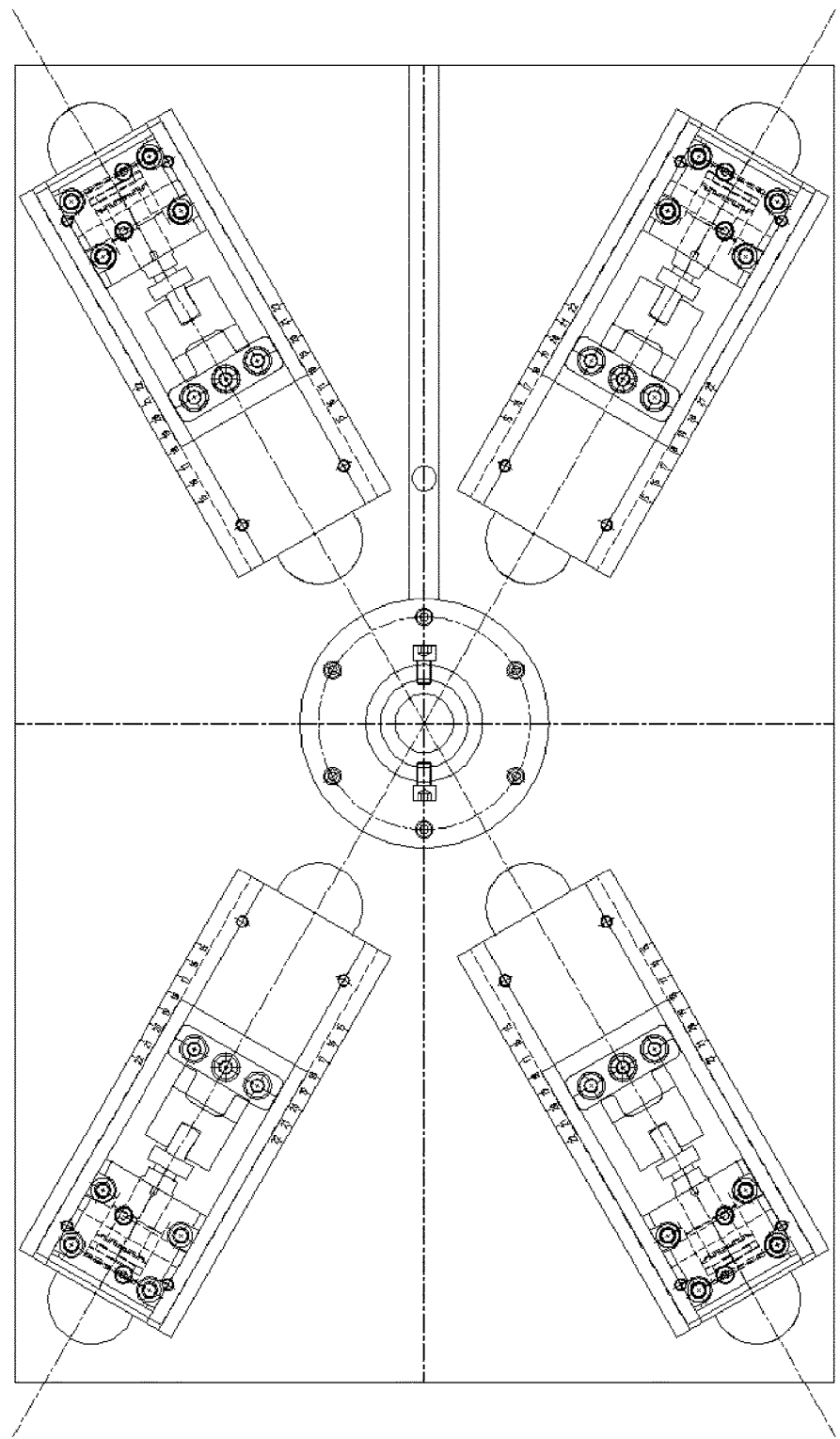
FIG. 2 is a top view of the wheel milling window device of the disclosure.
Figure 3:
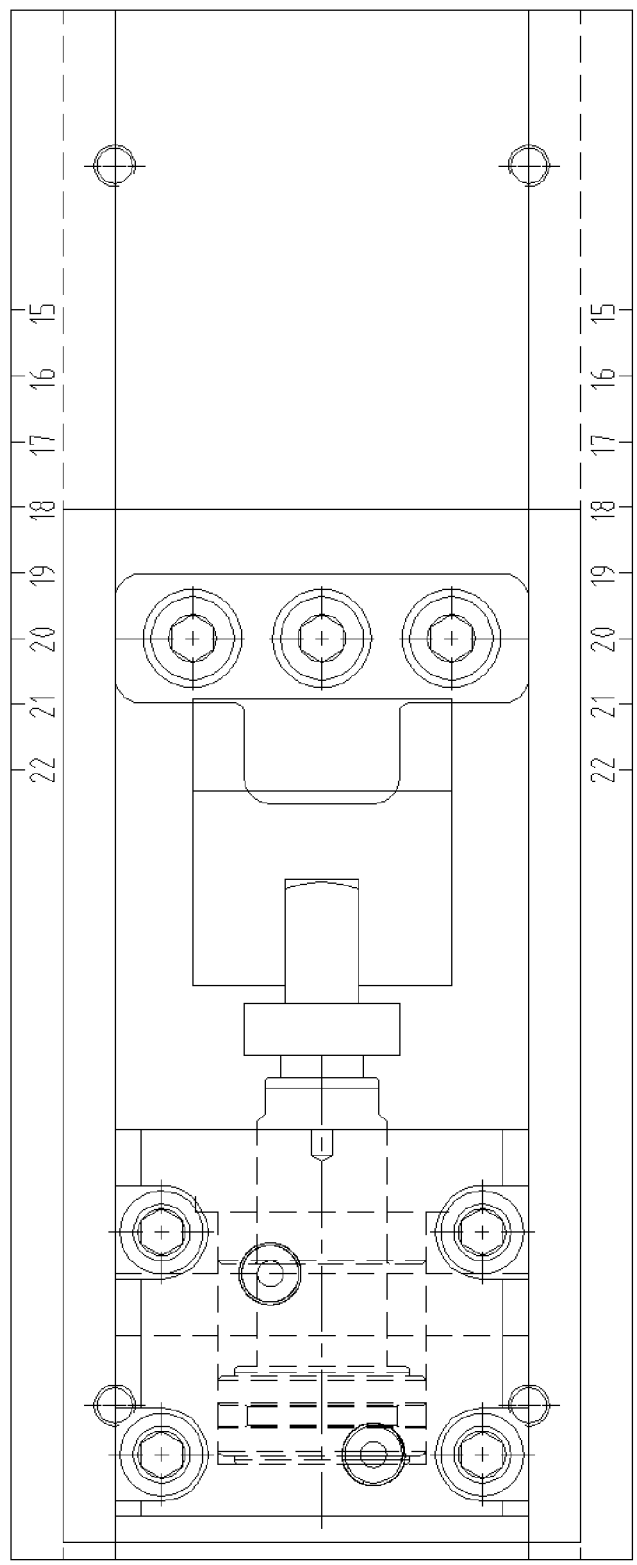
FIG. 3 is a top view of end face positioning of the wheel milling window device of the disclosure.
Figure 4:
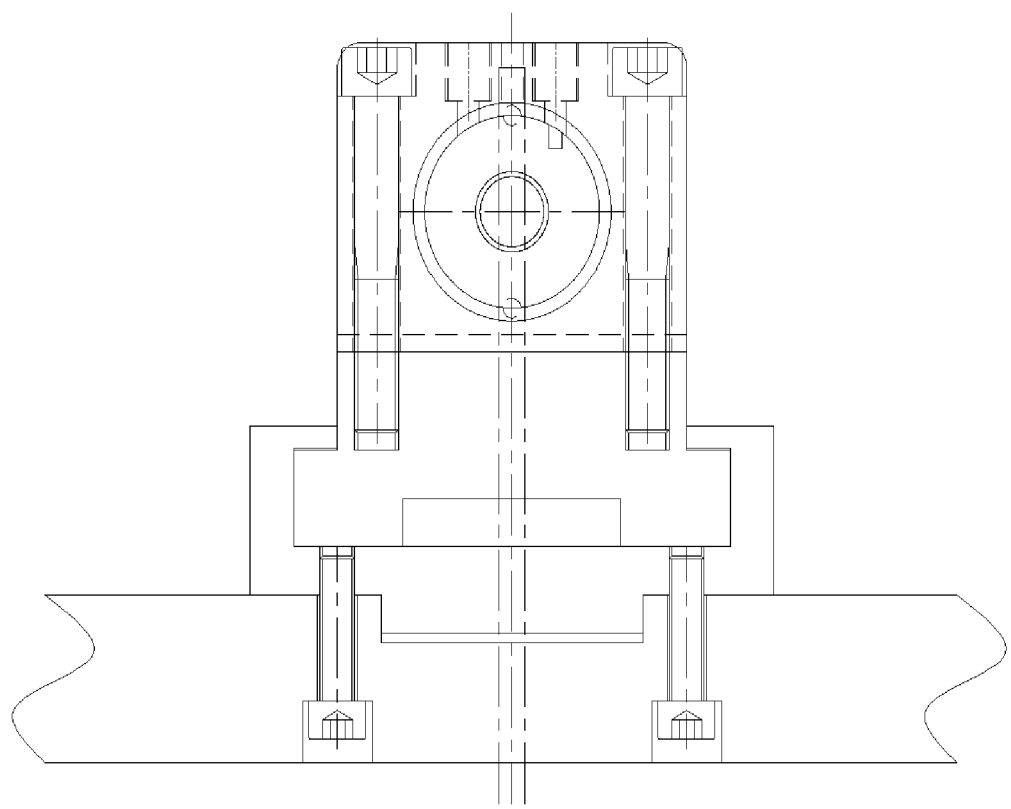
FIG. 4 is a left view of end face positioning of the wheel milling window device of the disclosure.
Figure 5:
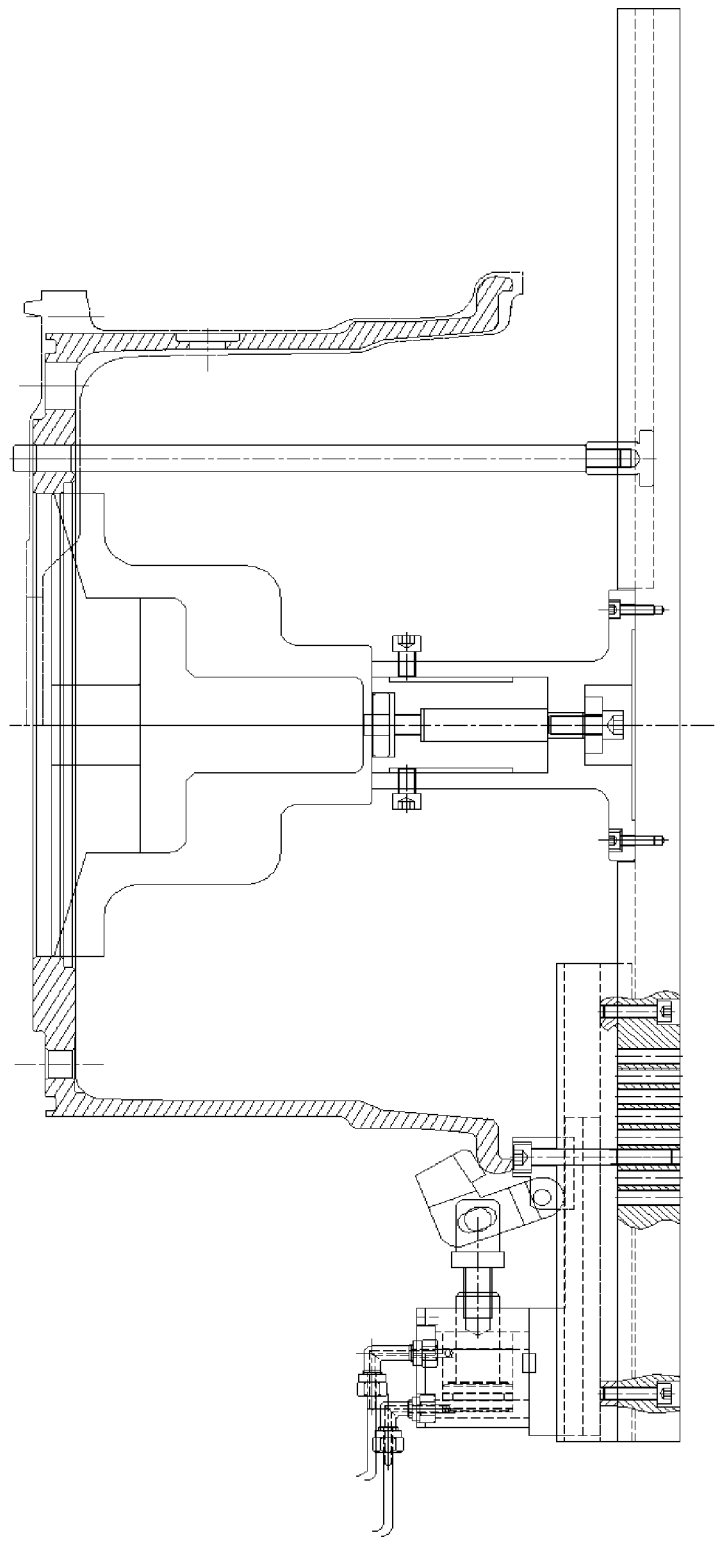
FIG. 5 is a schematic diagram of a running state of the wheel milling window device of the disclosure.

LIST OF REFERENCE SYMBOLS 1 bottom plate
2 guide block
3 clamping slide block
4 mounting key
5 hydraulic cylinder
6 hydraulic pipeline
7 connecting block
8 pressure claw
9 first rotating shaft
10 second rotating shaft
11 end face block
12 mandrel
13 mandrel seat
14 locking jackscrew
15 mandrel height adjusting post
16 mandrel guide post
17 mandrel guide post locking screw
18 locking ring
19 circumferential positioning post
20 circumferential slide block.

DETAILED DESCRIPTION

Details and working conditions of a specific device provided by the disclosure will be described below in combination with the accompanying drawings.

Embodiment 1

This embodiment discloses a wheel milling window device. The device is composed of a bottom plate 1, guide blocks 2, clamping slide blocks 3, mounting keys 4, hydraulic cylinders 5, hydraulic pipelines 6, connecting blocks 7, pressure claws 8, first rotating shafts 9, second rotating shafts 10, end face blocks 11, a mandrel 12, a mandrel seat 13, a locking jackscrew 14, a mandrel height adjusting post 15, a mandrel guide post 16, a mandrel guide post locking screw 17, a locking ring 18, circumferential positioning posts 19 and circumferential slide blocks 20. The bottom plate 1 is fixed on a machine tool via bolts, the four guide blocks 2 are fixed on the bottom plate 1 by screws, the clamping slide blocks 3 slide in slots of the guide blocks 2, each end face block 11 can be placed in a clamping slide block 3 and fixed by two screws, the end face blocks 11 and the clamping slide blocks 3 are fixed on the bottom plate 1 by screws, the hydraulic cylinders 5 are fixed on the clamping slide blocks 3 by the mounting keys 4 and screws, meanwhile, the hydraulic pipelines 6 are connected and fixed to the hydraulic cylinders 5 via screws, the connecting blocks 7 are fixed at the extension ends of the hydraulic cylinders 5 via threaded connection, the pressure claws 8 are articulated into holes of the connecting blocks 7 via the first rotating shafts 9 and simultaneously articulated to the end face blocks 11 via the second rotating shafts 10, the mandrel seat 13 is fixed on the bottom plate 1 via six screws, the mandrel height adjusting post 15 is in clearance fit in the hole of the mandrel seat 13, the mandrel guide post 16 is in clearance fit in the hole of the mandrel height adjusting post 15, the locking ring 18 and the mandrel guide post 16 are locked via threads by the mandrel guide post locking screw 17, the mandrel 12 is fixed on the mandrel height adjusting post 15 by a screw, and the circumferential positioning posts 19 can be fixed on the circumferential slide blocks 20 via threads.

In the working process, the end face blocks 11 scribed with scribed lines in the middle of end face positioning surfaces are fixed together with the clamping slide blocks 3; the clamping slide blocks 3 can slide in the slots of the guide blocks 2, the guide blocks 2 are scribed with scribed lines corresponding to different wheel sizes, and the positions of the scribed lines are determined according to the outer diameters of the rims of wheels having different sizes; when a wheel of one size is machined, the clamping slide blocks 3 fixed together with the end face blocks 11 can slide in the slots of the guide blocks 2, the scribed lines on the end face blocks 11 are aligned with the scribed lines of corresponding sizes on the guide blocks 2, then the end face blocks 11 and the clamping slide blocks 3 are fixed on the bottom plate 1 by bolts, and end face positioning of the wheel and adjustment of the compression position are thus realized.

The mandrel 12 corresponding to the diameter of the central hole of the wheel is placed on the mandrel height adjusting post 15, the extending height of the mandrel height adjusting post 15 on the mandrel seat 13 is adjusted via the screw, the mandrel height adjusting post 15 is locked by the locking jackscrew 14 after the height is adjusted, and radial positioning adjustment of the wheel is thus completed.

The circumferential slide blocks 20 slide to the pitch diameters of bolt holes or mounting holes of the wheel on the bottom plate 1, the circumferential positioning posts 19 are screwed down with the circumferential slide blocks 20, the circumferential positioning posts 19 can penetrate through the bolt holes or mounting holes of the wheel when the wheel is placed on the device, and a circumferential positioning function on the wheel is thus realized.

The wheel is placed on the end face blocks 11, radial positioning of the central hole is realized via the mandrel 12, the circumferential positioning posts 19 penetrate through the bolt holes or mounting holes, then the extension rods of the hydraulic cylinders 5 move linearly via the hydraulic system to drive the connecting blocks 7 to move, the first rotating shafts 9 are thus driven to move in shaft slots of the pressure claws 8, the pressure claws 8 move circumferentially using the second rotating shafts 10 as circle centers, and the wheel is pressed. The above device is referred to as an experimental group 1.

In this embodiment, further disclosed are the following experimental groups:

Experimental group 2: other setting is same as that of experimental group 1, but the difference lies in that the end face positioning of the fixture adopts a traditional slide block embedded positioning mode.

Experimental group 3: other setting is same as that of experimental group 1, but the difference lies in that the central positioning refers to a fixed mandrel seat where the height of the mandrel cannot be adjusted.

Experimental groups 1, 2 and 3 are simultaneously used for machining the same product and the time for replacing the fixture after machining is considered.

The device in this embodiment has the advantages of shortening 7 days for manufacturing a fixture, reducing the cost for machining the fixture by more than 300 CNY, and reducing the time for replacing the fixture from original 2 hours to 20 minutes. The machining flow of the disclosure is not obviously difference from the existing machining flow.

Thus, on the fixture for milling a wheel window, this device can reduce the machining cost, shorten the manufacturing period of the fixture and improve the production efficiency.

The invention claimed is:

1. A wheel milling window fixture, composed of a bottom plate, guide blocks, clamping slide blocks, mounting keys, hydraulic cylinders, hydraulic pipelines, connecting blocks, pressure claws, first rotating shafts, second rotating shafts, end face blocks, a mandrel, a mandrel seat, a locking jackscrew, a mandrel height adjusting post, a mandrel guide post, a mandrel guide post locking screw, a locking ring, circumferential positioning posts and circumferential slide blocks, wherein the bottom plate is fixed on a machine tool, the four guide blocks are fixed on the bottom plate, the clamping slide blocks slide in slots of the guide blocks, each end face block is fixed in a clamping slide block, the end face blocks and the clamping slide blocks are fixed on the bottom plate, the hydraulic cylinders are fixed on the clamping slide blocks by the mounting keys, the hydraulic pipelines are fixed on the hydraulic cylinders, the connecting blocks are fixed at the extension ends of the hydraulic cylinders, the pressure claws are articulated into holes of the connecting blocks via the first rotating shafts and simultaneously articulated to the end face blocks via the second rotating shafts, the mandrel seat is fixed on the bottom plate, the mandrel height adjusting post is in clearance fit in the hole of the mandrel seat, the mandrel guide post is in clearance fit in the hole of the mandrel height adjusting post, the locking ring and the mandrel guide post are locked by the mandrel guide post locking screw, the mandrel is fixed on the mandrel height adjusting post, and the circumferential positioning posts are fixed on the circumferential slide blocks.

2. The wheel milling window fixture of claim 1, wherein the end face blocks scribed with scribed lines in the middle of end face positioning surfaces are fixed with the clamping slide blocks together; the clamping slide blocks can slide in the slots of the guide blocks, the guide blocks are scribed with scribed lines corresponding to different wheel sizes, and the positions of the scribed lines are determined according to the outer diameters of the rims of wheels having different sizes; when a wheel of one size is machined, the clamping slide blocks fixed together with the end face blocks can slide in the slots of the guide blocks, the scribed lines on the end face blocks are aligned with the scribed lines of corresponding sizes on the guide blocks, then the end face blocks and the clamping slide blocks are fixed on the bottom plate by bolts, and end face positioning of the wheel and adjustment of the compression position are thus realized.

3. The wheel milling window fixture of claim 1, wherein the mandrel corresponding to the diameter of the central hole of the wheel is placed on the mandrel height adjusting post, the extending height of the mandrel height adjusting post on the mandrel seat is adjusted, the mandrel height adjusting post is locked by the locking jackscrew after the height is adjusted, and radial positioning adjustment of the wheel is thus completed.

4. The wheel milling window fixture of claim 1, wherein the circumferential slide blocks slide to the pitch diameters of bolt holes or mounting holes of the wheel on the bottom plate, the circumferential positioning posts are screwed down with the circumferential slide blocks, the circumferential positioning posts can penetrate through the bolt holes or mounting holes of the wheel when the wheel is placed on the device, and a circumferential positioning function on the wheel is thus realized.

5. The wheel milling window fixture of claim 1, wherein the wheel is placed on the end face blocks, the mandrel penetrates through the central hole, the circumferential positioning posts penetrate through the bolt holes or mounting holes, then the extension rods of the hydraulic cylinders move linearly via the hydraulic system to drive the connecting blocks to move, the first rotating shafts are thus driven to move in shaft slots of the pressure claws, and the pressure claws move circumferentially using the second rotating shafts as circle centers.

* * * * *